United States Patent
Stark

(10) Patent No.: US 8,741,375 B2
(45) Date of Patent: *Jun. 3, 2014

(54) MIXED AMINO ACID METAL SALT COMPLEXES

(75) Inventor: Peter A. Stark, Inver Grove Heights, MN (US)

(73) Assignee: Zinpro Corporation, Eden Prairie, MN (US)

( * ) Notice: Subject to any disclaimer, the term of this patent is extended or adjusted under 35 U.S.C. 154(b) by 360 days.

This patent is subject to a terminal disclaimer.

(21) Appl. No.: 13/154,753

(22) Filed: Jun. 7, 2011

(65) Prior Publication Data

US 2012/0315372 A1   Dec. 13, 2012

(51) Int. Cl.
*A23L 1/305* (2006.01)
*A23K 1/16* (2006.01)

(52) U.S. Cl.
CPC .............. *A23L 1/305* (2013.01); *A23L 1/3051* (2013.01); *A23V 2250/062* (2013.01); *A23V 2250/063* (2013.01); *A23V 2250/1598* (2013.01)
USPC .......................................... 426/656; 426/648

(58) Field of Classification Search
USPC ................................. 426/618, 630
See application file for complete search history.

(56) References Cited

U.S. PATENT DOCUMENTS

| | | |
|---|---|---|
| 3,440,054 A | 4/1969 | Sair |
| 3,463,858 A | 8/1969 | Anderson |
| 3,775,132 A | 11/1973 | Richards, Jr. |
| 3,941,818 A | 3/1976 | Abdel-Monem |
| 3,950,372 A | 4/1976 | Abdel-Monem |
| 3,969,540 A | 7/1976 | Jensen |
| 4,020,158 A | 4/1977 | Ashmead et al. |
| 4,021,569 A | 5/1977 | Abdel-Monem |
| 4,039,681 A | 8/1977 | Abdel-Monem |
| 4,067,994 A | 1/1978 | Anderson et al. |
| 4,076,803 A | 2/1978 | Ashmead |
| 4,103,003 A | 7/1978 | Ashmead |
| 4,172,072 A | 10/1979 | Ashmead |
| 4,670,269 A | 6/1987 | Abdel-Monem |
| 4,678,854 A | 7/1987 | Abdel-Monem |
| 4,863,898 A | 9/1989 | Ashmead et al. |
| 4,900,561 A | 2/1990 | Abdel-Monem et al. |
| 4,948,594 A | 8/1990 | Abdel-Monem et al. |
| 4,956,188 A | 9/1990 | Anderson |
| 5,061,815 A | 10/1991 | Leu |
| 5,278,329 A | 1/1994 | Anderson |
| 5,583,243 A | 12/1996 | Abdel-Monem |
| 5,591,878 A | 1/1997 | Nelson et al. |
| 5,698,724 A | 12/1997 | Anderson et al. |
| 5,707,679 A | 1/1998 | Nelson |
| 5,795,615 A | 8/1998 | Nelson et al. |
| 5,846,581 A | 12/1998 | Catron |
| 6,166,071 A | 12/2000 | Ashmead et al. |
| 6,197,815 B1 | 3/2001 | Hsu |
| 7,129,375 B2 | 10/2006 | Abdel-Monem et al. |
| 2007/0172551 A1 | 7/2007 | Thompson et al. |

OTHER PUBLICATIONS

Jain, A. K. et al., "Studies of Mixed Ligand Chelates of L-Glutamic Acid and L-Lysine Monohydrochloride with Cu2+, Fe2+, Co2+, Ni2+ and VO2+", Indian J. Phy. Nat. Sci. vol. 4, Sec. A, Mar. 1984, pp. 25-30.
Zinpro Corporation, PCT/US2011049262 filed Aug. 26, 2011, "International Search Report" and "Written Opinion of the International Searching Authority", mailed Jun. 26, 2012.

*Primary Examiner* — Jyoti Chawla
(74) *Attorney, Agent, or Firm* — McKee, Voorhees & Sease, P.L.C.

(57) ABSTRACT

A mixed amino acid metal salt complex of the mixed amino acids, lysine and glutamic acid associated with trace metals selected from the group consisting of iron, manganese, copper and zinc to provide highly bioavailable sources of the iron, manganese, copper and zinc and as well to take advantage of the different amino acid transport pathways of lysine and glutamic acid.

5 Claims, No Drawings

MIXED AMINO ACID METAL SALT COMPLEXES

FIELD OF THE INVENTION

This invention relates to the field of animal feed supplements and more particularly to the preparation and nutritional value of novel mixed amino acid metal salt complexes that are highly soluble, and highly processable.

BACKGROUND OF THE INVENTION

The presence of essential metals (trace elements) in sufficient quantities and in a biologically available form in diet is essential for maintaining the health and well-being of domestic animals and poultry. Because essential metals such as copper, iron, manganese and zinc are often deficient in common feed ingredients, supplemental amounts of these nutrients are often added to the feed of domesticated animals and poultry. Many commercial feed additives have been developed to provide the essential metals in forms that are readily biologically utilizable. The degree of biological availability of nutrients is often referred to as "bioavailability". Bioavailability of essential metals depends on the physical and/or chemical properties of the form in which the metal is present in the diet. Increased bioavailability of supplemental metals is beneficial because it allows the use of lower concentrations of the metals in the diet to meet the nutritional needs of animals, while lowering the potential harmful effects of high levels of these metals both on the animals and on the environment.

Several commercial products are available in which trace elements are more bioavailable than the corresponding inorganic source of the metal. The enhanced bioavailability is attributed to the association of the metal with an organic molecule, generally known as ligand. This association or bonding results in the increased availability of the metal for utilization by animals, i.e. increased bioavailability. The increased bioavailability of the essential elements in these products is the result of increased solubility, greater stability in the gut, enhanced absorption into circulation and/or improved metabolic utilization.

Different types of products that contain a trace element associated with an organic ligand are commercially available. These can be classified in different groups based on the nature of the ligand used in manufacturing the product. In one class of products, amino acids are used as the ligands that form complexes or chelates with the metal. Examples of these products are described in U.S. Pat. Nos. 3,941,818; 3,950,372; 4,067,994; 4,863,898 4,900,561; 4,948,594; 4,956,188; 5,061,815; 5,278,329; 5,583,243; and 6,166,071. A second group of feed additives include the metal salts of short chain carboxylic acids such as propionic acid (See U.S. Pat. Nos. 5,591,878, 5,707,679, 5,795,615 and 5,846,581). A third group of trace element additives is classified by the American Feed Control Officials as Metal Proteinate and defined as "the product resulting from the chelation of a soluble salt with amino acids and/or partially hydrolyzed protein". Examples of these products are described in U.S. Pat. Nos. 3,440,054, 3,463,858, 3,775,132, 3,969,540, 4,020,158, 4,076,803, 4,103,003, 4,172,072 and 5,698,724

The assignee of the present application has in the past synthesized and patented metal complexes of amino acids as a more bioavailable source of the essential elements. The following are examples of these patents: U.S. Pat. Nos. 3,941,818; 3,950,372; 4,021,569; 4,039,681; and 4,067,994 disclose 1:1 complexes of alpha amino acids, preferably DL-methionine with the transition metals zinc, chromium, manganese and iron. The formation of similar complexes with L-methionine is disclosed in U.S. Pat. No. 5,278,329. U.S. Pat. Nos. 4,900,561 and 4,948,594 disclose copper complexes of alpha amino acids containing terminal amino groups. Complexes of copper, manganese, zinc and iron with alpha hydroxyl aliphatic carboxylic acids are disclosed in U.S. Pat. Nos. 4,956,188 and 5,583,243. U.S. Pat. Nos. 4,670,269 and 4,678,854 disclose complexes of cobalt with polyhydroxyl carboxylic acid such as glucoheptanoic acid. Complexes of the amino acid L-lysine with trace elements are disclosed in U.S. Pat. No. 5,061,815. The effectiveness of the compounds disclosed in these patents has been demonstrated from data provided in some of these patents and in numerous scientific publications and technical reports.

The above patents describe the use of pure synthetic or natural amino or hydroxyl acids. In U.S. Pat. No. 5,698,724 the assignee of the current application disclosed the synthesis of complexes of essential elements with natural amino acids obtained by the hydrolysis of proteins. Since this patent was issued, a large number of field studies have demonstrated that metals from these complexes are more bioavailable than metals from inorganic sources.

Based on Zinpro Corporation's experience with metal-amino acid complexes as described in the references cited above, we have concluded that the 1:1 complexes of the metals Zn, Mn, Cu, Co, Fe are effective nutritional sources of the metals and more advantageous than the 1:2 complexes. These 1:1 complexes exist as ion pairs in which the metal-amino acid comprises the cation. The counter ion (anion) is provided by a mineral acid and is necessary for balancing the charge on the cation. The requirement for the external anion results in products in which the metal content is limited.

The invention of U.S. Pat. No. 7,129,375 was to develop metal amino acid complexes in which the amino acid serves a dual role. It serves as the bidentate ligand to form a complex with the metal ion, and it serves as the counter ion to balance the charge on the cationic complex. One of the acids used in that invention was glutamic acid. While these types of complexes are useful as animal feed supplements, they suffer from difficulties during the drying process.

Lysine is an essential amino acid in the diet of mammals. That is, lysine cannot be synthesized by mammals at a rate adequate to meet metabolic requirements and so must be supplied in the diet. Corn (Zea mays L.) is notoriously low in lysine and, if used in a single grain ration, requires lysine supplementation to maintain animal health and for economical animal growth. The present invention, by forming metal lysine complexes, supplements both trace metals and the essential amino acid lysine by the addition of a single dietary supplement. It is believed that the metal component of the metal lysine complex is more easily transported through the intestinal wall with the lysine component than when in the form of an ionic salt. Lesser amounts of the metals, accordingly, may be added to the diet to effect adequate supplementation.

In another commonly owned U.S. Pat. No. 5,061,815, the amino acid lysine (Lys) is complexed with a metal ion (M), where M is iron ($Fe^{++}$ or $Fe^{+++}$), copper ($Cu^{++}$), zinc ($Zn^{++}$), manganese ($Mn^{++}$) or cobalt ($CO^{++}$) by reaction in an aqueous solution under acidic conditions of a lysine containing compound and a salt of the metal. These complexes are either a 1:1 metal to lysine ([Lys]M) complexes or a 2:1 lysine to metal ($[Lys]^2$ M) complex. These complexes, when administered parenterally or as a dietary supplement in animals or as a foliar spray in plants, provide a readily assimilated source of the metals for use in the metabolic processes of the organism.

It can be seen from the above description that organic trace minerals have a wide acceptance for the benefits in animal nutrition. There are many patents related to their structures, use and manufacturing. There are also many different types of ligands used in their production. Each of these metal complexes discussed has advantages and disadvantages. One of the more common ligands that have been around for a number of years are the amino acids. For amino acids only four are commercially available at a reasonable cost to produce organic trace minerals. Those four are methionine, glutamic acid, glycine and lysine. Lysine and glutamic acid are particularly desirable because of ease of solubility and readily available sources at reasonable cost. The lysine and glutamic acid combination also are from two different classes of amino acids (cationic and anionic). Each of these metal amino acid complexes has advantages and disadvantages. This patent seeks to eliminate the disadvantages while retaining all the advantages.

Accordingly, it is a primary objective of the present invention to prepare reasonable cost, highly soluble mixed amino acid ligands of lysine and glutamic acid with metals for animal nutrition, particularly trace elements iron, manganese, copper and zinc. One advantage of the mixed amino acid salt is that it combines a pendant acid and a pendant base that form a salt to ensure solubility.

Another important objective of the present invention is to provide additional supplements for animals/poultry that contain mixed amino acid complexes that take advantage of use of two different amino acid transport pathways for providing bioavailability of both the amino acid and the associated trace element, metal.

The method and means of accomplishing these as well as other objectives of the invention will become apparent from the description which follows.

SUMMARY OF THE INVENTION

A mixed amino acid metal salt complex of the mixed amino acids, lysine and glutamic acid associated with trace metals selected from the group consisting of iron, manganese, copper and zinc to provide highly bioavailable sources of the iron, manganese, copper and zinc and as well to take advantage of the different amino acid transport pathways of lysine and glutamic acid.

DETAILED DESCRIPTION OF THE PREFERRED EMBODIMENTS

The mixed amino acid metal salt complexes of the present invention have the formula:

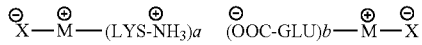

wherein M is a metal ion selected from the group consisting of iron, manganese, copper and zinc, (a) and (b) are numbers selected so the ratio of LYS:GLU is within the range of 40:60 to 60:40, and X is an anion selected to balance the metal ion charge. As seen from the above formula, M represents the trace metal and M can be selected from the group of iron, manganese, copper and zinc. Preferably, single metal ions but also they could be mixed metal ions, that is, one M representing say iron and the other M representing say copper or zinc. Lysine is represented by [LYS] and the amino acid glutamic acid is represented by (GLU). The (a) and (b) represent fractions of from 0.4 to 0.6 and (a)+(b) equals 1.00 so that the ratio of lysine:glutamic acid is within the ratio of 40:60 to 60:40. Preferably (a) and (b) are equal and 0.5. Put another way, (a) represents the percentage of lysine and (b) represents the percentage of glutamic acid in the total amount of mixed amino acid.

X represents the anion selection to balance the metal ion and may be selected from the group consisting of hydroxyl, halides, sulfates, phosphates and acetate. Preferably X is a halide, most preferably X is chloride.

The products may be used in the carrier-free form or with a carrier. Suitable carriers include calcium, hydrogen phosphate, calcium carbonate, silica, ground corn cobs and powdered sugar or mixtures of any of the above.

As a general guideline for iron, zinc, manganese and copper mixed amino acid complexes, the general range of feeding amounts should be within these guidelines:

1) Zinc mixed amino acid may be fed at the rate of 155-1800 ppm of the zinc mixed amino acid complex equivalent to 30-360 ppm of zinc depending on the animal species. Preferred level is 200-1500 ppm of zinc mixed amino acid.
2) Manganese mixed amino acid may be fed at the rate of 25-900 ppm of the manganese mixed amino acid complex equivalent to 5-180 ppm of manganese depending on the animal species. Preferred level is 50-250 ppm of manganese mixed amino acid.
3) Copper mixed amino acid may be fed at the rate of 25-250 ppm of the Copper mixed amino acid complex equivalent to 5-50 ppm of copper depending on the animal species. Preferred level is 50-125 ppm of copper mixed amino acid.
4) Iron mixed amino acid may be fed at the rate of 50-3500 ppm of the iron mixed amino acid complex equivalent to 10-700 ppm of iron depending on the animal species. Preferred level is 500-3000 ppm of iron mixed amino acid.

Manufacturing and handling of feed additives is an important consideration for their utility. There are numerous processing advantages to prepare complexes that remain soluble indefinitely. There are also patents on stable solutions of amino acids that are made up of lysine, glycine, leucine etc. The exact mechanism for the utility of amino acid organic trace minerals have never been completely elucidated but there is strong evidence that they are absorbed via the amino acid transport system. As such, it has been speculated that there are advantages to having more than 1 amino acid as the ligand to utilize more than one transport pathway. Methionine is not a very soluble amino acid and with time in solution it will precipitate as free Methionine regardless of other amino acids in the composition. Lysine and glycine are known to be water soluble so mixtures of them at any ratio would also be water soluble. Glycine is also an achiral amino acid and there is significant evidence that it is one of the poorer adsorbed amino acids. This would be a limitation of using only glycine. This patent describes a situation that takes into account all of these criteria for the commonly available amino acids (cost, manufacturing, water stability and adsorption) and has found a niche where all can be achieved. A combination of glutamic acid with lysine allows for a stable form of the amino acid organic trace mineral that can't be obtained by glutamic acid alone. It combines an anionic amino acid and a cationic amino acid that have different transport proteins. It is stable, relatively low cost, allows for a mixture of amino acids and is easily processable. It can be used as a stable solution or dried without the problem of precipitation. The pendant amine and acid from each of the components allows for a salt that keeps both components in solution.

The most preferred mixed amino acid metal salt complexes are 1 to 1 ratios of the lysine and glutamic acid providing a complex of the following formula:

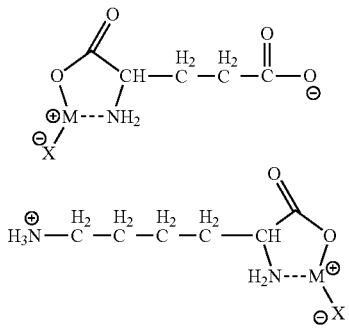

M and X are as previously described.

The process of forming these mixed amino acids is straight forward. The mixed amino acid complexes are formed by first dissolving the amino acids in water. The sources of the amino acids are lysine hydrochloride and monosodium glutamate. The appropriate molar equivalents are both dissolved in water at about 40% solids. Then 1 molar equivalent of metal salt based on total amino acid, as the chloride or sulfate, is added to this mixture. Although other sources of the mineral are possible. The metal salt is added with enough additional water to give a final percent solids of about 50%. The mixture is then heated to about 50° C. for one hour, cooled to room temperature and then the water removed. For lab scale batches the water is removed by rotary evaporation or pan drying and for production batches via a spray dryer. Several examples of these types of complexes have been prepared.

The following examples are offered to further illustrate but not limit the product process and nutritional supplementing composition of the present invention.

Typical Example 3 from Table

Into a 250 mL erylenmeyer flask was added 100 mL of water. To this 20.7 gr of lysine HCl (0.113 moles) and 21.2 gr of MSG (0.113 moles) was added and dissolved. To this solution were added 38.66 gr of CuCl2 dihydrate (0.226 moles) and an additional 35 mL of water. The mixture was heated and stirred and then placed in a pan for drying.

The following table shows additional examples, all run under conditions similar or identical to the above Typical Example.

TABLE OF EXAMPLES

| Example | Molar % of Amino Acid | | Metal | Comment |
| | Lysine | Glutamic Acid | | |
|---|---|---|---|---|
| 1 | 50 | 50 | ZnCl2 | stable solution |
| 2 | 50 | 50 | ZnSO4 | stable solution |
| 3 | 50 | 50 | CUCl2 | stable solution |
| 4 | 50 | 50 | CuSO4 | stable solution |
| 5 | 50 | 50 | MnSO4 | stable solution |
| 6 | 50 | 50 | FeCl2 | stable solution |
| 7 | 50 | 50 | FeSO4 | stable solution |

TABLE OF EXAMPLES -continued

| Example | Molar % of Amino Acid | | Metal | Comment |
| | Lysine | Glutamic Acid | | |
|---|---|---|---|---|
| 8 | 40 | 60 | CuSO4 | stable solution |
| 9 | 40 | 60 | MnSO4 | stable solution |
| 10 | 60 | 40 | ZnCl2 | stable solution |
| 11 | 55 | 45 | FeCl2 | stable solution |
| C1 | 30 | 70 | ZnCl2 | ppt formed |
| C2 | 30 | 70 | CUCl2 | ppt formed |
| C3 | 0 | 100 | ZnCl2 | ppt formed |
| C4 | 0 | 100 | FeCl2 | ppt formed |
| C5 | 0 | 100 | MnSO4 | ppt formed |

The comparative examples (C1-C5) are different than the claimed ratios and illustrate that the zinc and copper complexes precipitated immediately. The Fe and Mn formed a precipitate with time. This demonstrates the need for the claimed ratios to be maintained to achieve Applicant's results of stability.

What is claimed is:

1. A mixed water soluble amino acid metal salt 1:1 complex of the mixed amino acid moieties lysine (LYS) and glutamic acid (GLU) of the formula:

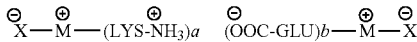

wherein M is a metal ion selected from the group consisting of iron, manganese, copper and zinc, (a) and (b) are numbers selected so the ratio of LYS:GLU is within the range of 40:60 to 60:40, and X is an anion selected to balance the metal ion charge.

2. The mixed amino acids of claim 1 wherein X is an anion selected from the group consisting of hydroxyl, halides, sulfates, phosphates and acetate.

3. The mixed amino acids of claim 1 wherein the numbers (a) and (b) are equal and are 0.5.

4. A mixed water soluble amino acid metal salt 1:1 complex of the formula:

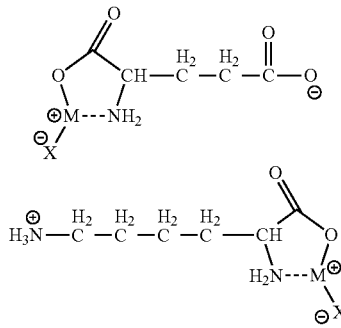

wherein M is selected from the group consisting of iron, manganese, copper and zinc, and x is selected from the group of hydroxyl, halides, sulfates, phosphates and acetate.

5. A nutritional supplementing composition for animals comprising an animal feed carrier and a nutrition supplementing effective amount of a mixed water soluble amino acid metal salt complex of the mixed amino acid moieties lysine (LYS) and glutamic acid (GLU) of the formula:

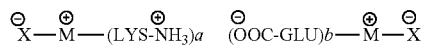
wherein M is a metal ion selected from the group consisting of iron, manganese, copper and zinc, (a) and (b) are numbers selected so the ratio of LYS:GLU is within the range of 40:60 to 60:40, and X is an anion selected to balance the metal ion charge.
* * * * *